(12) United States Patent
Lange et al.

(10) Patent No.: US 6,934,762 B1
(45) Date of Patent: Aug. 23, 2005

(54) METHOD AND APPARATUS FOR PROVIDING BACKUP INTERNET ACCESS

(75) Inventors: Alan Lange, Jackson, MS (US); John Buckley, Chantilly, VA (US)

(73) Assignee: Redundant Networks, Inc., Jackson, MS (US)

(*) Notice: Subject to any disclaimer, the term of this patent is extended or adjusted under 35 U.S.C. 154(b) by 0 days.

(21) Appl. No.: 09/560,685

(22) Filed: Apr. 27, 2000

(51) Int. Cl.[7] ............................................. G06F 15/173
(52) U.S. Cl. ..................... 709/239; 709/202; 709/203; 709/218; 709/223; 709/224; 709/225; 709/238
(58) Field of Search ................................ 709/202–204, 709/217–219, 223–225, 238–239, 249; 370/216, 385–386, 401

(56) References Cited

U.S. PATENT DOCUMENTS

| | | | | |
|---|---|---|---|---|
| 4,442,519 | A | | 4/1984 | Jones et al. ................. 714/718 |
| 5,200,949 | A | | 4/1993 | Kobayashi ................. 370/228 |
| 5,329,521 | A | | 7/1994 | Walsh et al. ................. 370/225 |
| 5,933,490 | A | | 8/1999 | White et al. ........... 379/221.01 |
| 5,949,753 | A | | 9/1999 | Alexander, Jr. et al. .... 370/216 |
| 6,023,724 | A | * | 2/2000 | Bhatia et al. ................ 709/218 |
| 6,049,825 | A | * | 4/2000 | Yamamoto ................. 709/221 |
| 6,104,870 | A | * | 8/2000 | Frick et al. ................. 370/386 |
| 6,173,312 | B1 | * | 1/2001 | Atarashi et al. ............ 709/238 |
| 6,286,048 | B1 | * | 9/2001 | Moberg ...................... 709/225 |
| 6,373,838 | B1 | * | 4/2002 | Law et al. .................. 709/203 |
| 6,484,206 | B2 | * | 11/2002 | Crump et al. ............... 709/223 |
| 6,611,533 | B1 | * | 8/2003 | Liao et al. ................. 709/230 |

OTHER PUBLICATIONS

Building Internet Firewalls, D. Brent Chapman and Elizabeth D. Zwicky, 1995, pp. 78–81.
Direct Connection web site, dircon.net, original publication date uncertain, (No Date).
Network Computing web site, networkcomputing.com, original publication date uncertain, (No Date).

* cited by examiner

*Primary Examiner*—Bharat Barot
(74) *Attorney, Agent, or Firm*—Robert R. Lech; Calfee, Halter & Griswold LLP

(57) ABSTRACT

A method, an apparatus and a system for providing secondary or backup Internet access are disclosed. The system includes a local network server having a primary router for directing data to/from a primary Internet backbone and a secondary router for directing data to/from a secondary Internet backbone. The primary router is connected to a primary local communications circuit employing a primary transmission medium. A primary point of presence is connected to the primary local communication circuit, and thereby provides primary Internet access via a primary Internet backbone. The secondary router is connected to a secondary local communications circuit employing a secondary transmission medium different than the primary transmission medium. A secondary point of presence is connected to the secondary local communication circuit, and thereby provides secondary Internet access via a secondary Internet backbone. The system employs control logic for detecting a failure to provide Internet access via the primary router, and for directing communication to the secondary router. A method and an apparatus for providing secondary Internet access are also disclosed.

8 Claims, 2 Drawing Sheets

METHOD AND APPARATUS FOR PROVIDING BACKUP INTERNET ACCESS

TECHNICAL FIELD OF THE INVENTION

The present invention relates generally to methods and systems for providing auxiliary or backup Internet connectivity.

GLOSSARY OF TERMS

The specification employs certain terms and acronyms that refer to various elements, organizations, services and protocols associated with Internet connectivity. Although some of these terms and acronyms are generally known and used, their definitions are not strictly standardized in the art. For purposes of this specification, the following terms and acronyms will therefore be defined as follows:

BGP Border Gateway Protocol—A Transmission Control Protocol/Internet Protocol (TCP/IP) routing protocol or interdomain routing in networks. It is typically used in the Internet for exchanging routing information between autonomous systems.

CLEC Competitive Local Exchange Carrier—Competitors to Incumbent Local Exchange Carriers (ILECs), CLECs compete on a selective basis for local exchange service, long distance, international, Internet access and other communication services. CLECs build or rebuild their own local loops, wired or wireless. They also lease local loops from the ILECs at wholesale rates for resale to end users.

GRP Gateway Routing Protocol—The suite of TCP/IP protocols that is used to exchange routing information between autonomous systems. These protocols include BGP, EIGRP, HSRP and IGRP.

ILEC Incumbent Local Exchange Carrier—One of the companies comprising the Regional Bell Operating Companies (RBOCs).

Internet In short, a network of computer networks joined together over high-speed backbone data links. In its present embodiment, the Internet is a packet switched network based on a family of protocols known as Transmission Control Protocol/Internet Protocol (TCP/IP). This family of protocols provides communication across interconnected networks, between computers with diverse hardware architectures and between various computer operating systems.

ISP Internet Service Provider—A vendor which provides access for its customers (companies and private individuals) to the Internet and the World Wide Web.

ISP Backbone A high speed circuit or circuits linking an ISP to the Internet. These circuits are typically interconnected at specified points known as network access points.

LAP Local Access Provider—The provider of the local communications circuit between a customer's premises and the point of presence of a CLEC, ILEC or other LAP. (see "Local Communications Circuit" below).

LCC Local Communications Circuit—The connection between a customer's premises and a point of presence of a CLEC, ILEC or other Local Access Provider. Also commonly referred to as a "local loop" or "local access circuit." A local communications circuit can be a copper, fiber, or wireless circuit (see "Wireless" below).

LMDS Local Multipoint Distribution System.

MMDS Multichannel Multipoint Distribution Service.

Pathway The route which a telecommunications signal follows through a terrestrial circuit or through the air in a wireless circuit (see "Wireless" below).

POP Point of Presence—A physical place where a CLEC, ILEC or other Local Access Provider has a presence for network access. A POP can also be a meeting point for ISPs where they exchange traffic and routes.

Router In the strictest terms, a router is a hardware and/or software interface between two networks. They are self-learning, and can communicate their existence and can learn of new routers, nodes and network segments. They also can constantly monitor the condition of a network and dynamically adapt to changes in network conditions.

VOFDM Vector Orthagonal Frequency Division Multiplexing.

Wireless Without wires. As used in this application, "wireless" includes but is not necessarily limited to access circuits based on laser, satellite, microwave, radio wave, analog cellular, digital cellular, LMDS, MMDS, or VOFDM technologies and implementations.

BACKGROUND OF THE INVENTION

Having reliable Internet connectivity has recently become essential for organizations of all types and sizes. Whether it is needed for communication purposes between employees of an organization, for conducting electronic commerce, or for a variety of other purposes, many organizations now rely on Internet connectivity every day in order to effectively operate. Organizations without reliable Internet access can quickly lose competitive advantage, revenue, future sales, and the ability to communicate both internally and externally. Lack of reliable Internet connection can also negatively impact productivity as more and more daily tasks of personnel are related to using the Internet.

Primary Internet connections routinely fail for a variety of reasons. Power outages, hardware and software failures, and failures in one or more of the elements of physical connectivity which enable Internet connections to remain active can all cause Internet connections to fail.

Many primary Internet connections fail due to a wide variety of failures in hardware, software, or the physical connections that comprise the elements of the physical connectivity required to keep these connections active. Router failures, severed underground or other cables and/or connections, hardware and/or software problems in the Point of Presence ("POP") of Internet Service Providers ("ISP") or Local Access Providers ("LAP"), and other failures associated with physical connectivity all can cause primary Internet connection failures.

Therefore, a need exists for a method and apparatus which provides an improved backup Internet access service that automatically carries Internet traffic when the primary connection to the Internet fails.

SUMMARY OF THE INVENTION

In accordance with the present invention, a method and apparatus for a managed backup Internet access service is provided which is dedicated solely to automatically carrying Internet traffic when the primary connection to the Internet fails. The present invention accounts for a variety of different types of failures in the elements of primary physical Internet connectivity, and automatically carries the Internet traffic normally carried by the primary Internet connection in the event it fails. In addition, the present invention provides for a different type of physical connectivity in the local loop element of the Internet connection, as this element often fails and causes Internet connections to fail.

It is a feature of the present invention to provide automatic switchover to a secondary or backup Internet access system without the need for intervention by the user of the primary, Internet access system.

The present invention advantageously provides a backup Internet access system that is engineered differently and is physically separate from the primary Internet access system, yet only costs the user a fraction of the cost of the primary Internet access system.

The objects, features and advantages of the present invention are readily apparent from the following description of the preferred embodiments when taken in connection with the accompanying drawings.

BRIEF DESCRIPTION OF THE DRAWINGS

For a more complete understanding of the present invention and the advantages thereof, reference is now made to the following description taken in conjunction with the accompanying drawings in which like reference numbers indicate like features and wherein.

DRAWING REFERENCE NUMERALS

Figure 1:
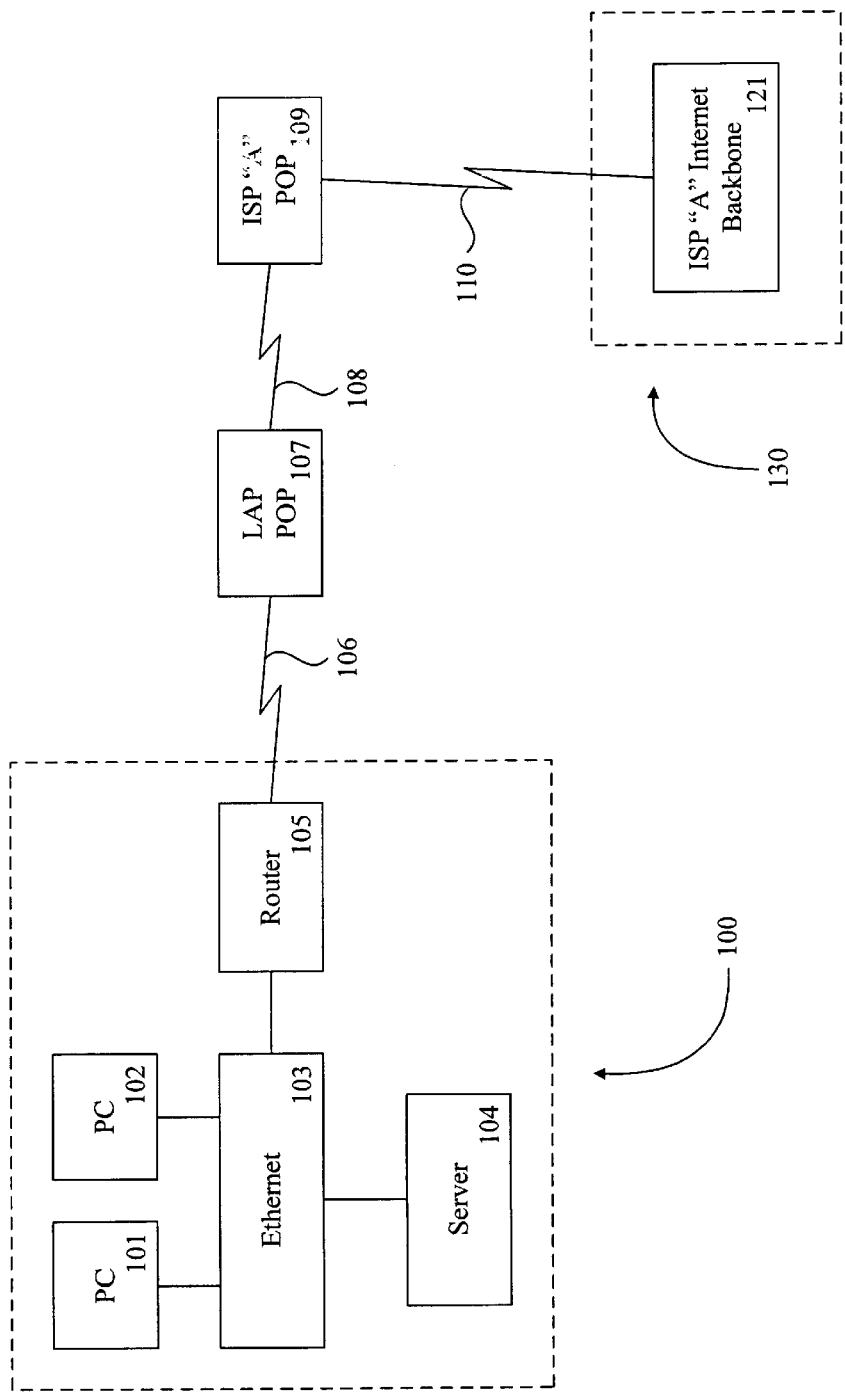
FIG. 1 is a block diagram illustrating a typical prior art network having a single primary connection to the Internet.

The, following reference characters identify the associated elements depicted in the drawings describing the present invention:

TABLE A

Element Descriptions and Associated Reference Numerals

| | |
|---|---|
| 100 Internal Network | 210 Backup Router |
| 101 Network Access Device | 212 Backup Local Communications |
| 102 Network Access Device | Circuit |
| 103 Ethernet Network | 214 Alternative LAP POP |
| 104 Network Server | 216 Backup Pathway |
| 105 Router | 218 Backup POP |
| 106 Local Communications Circuit | 220 Backup Pathway |
| 107 LAP POP | 222 Backup Pathway |
| 108 Pathway | 224 Backup Pathway |
| 109 ISP "A" POP | 226 ISP "B" Backbone |
| 110 Pathway | 228 ISP "C" Backbone |
| 121 ISP "A" Backbone | 230 ISP "D" Backbone |
| 130 The Internet | 232 ISP "E" Backbone |

DETAILED DESCRIPTION OF THE DRAWINGS

Embodiments of the present invention will be described in detail with reference to the accompanying drawings. In the following description, the present invention will be discussed in connection with a typical Ethernet local area network system of a typical organization. It should be understood that this is for purposes of clarity only, and that the present invention may be employed by any network used by an organization to connect to the Internet without departing from the intended scope of the present invention.

Figure 2:
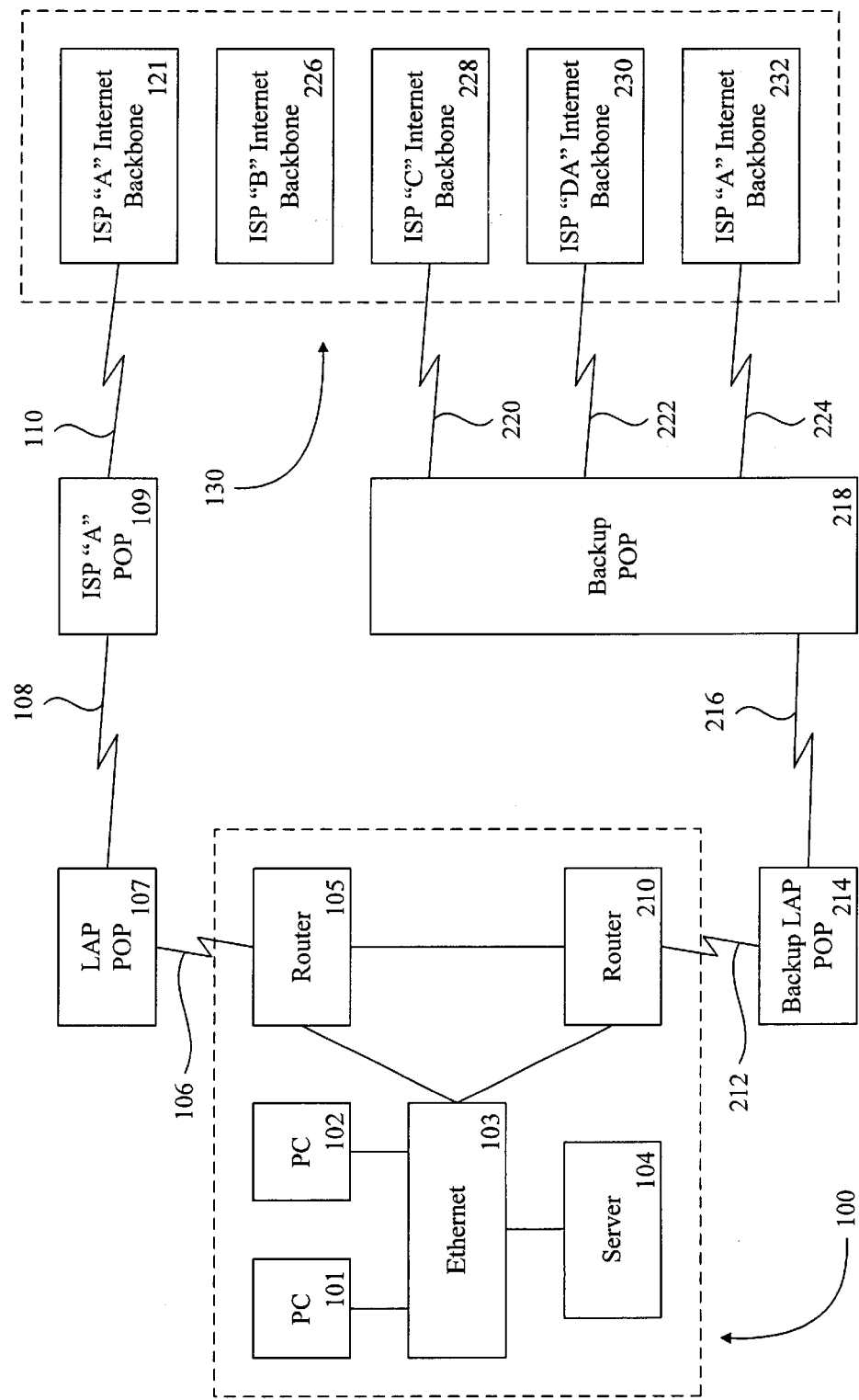
FIG. 2 is a block diagram illustrating a network having a primary and secondary connection to the Internet according to the teachings of the present invention.

FIG. 1 depicts a typical prior art internal network 100 used by an organization to connect to the Internet 130, and a typical high-speed connection to the Internet depicted by elements having reference numerals 106 through 110. The preferred embodiment of the present invention is illustrated in FIG. 2, like numerals being used to refer to like and corresponding parts of the two drawings.

Referring to FIG. 1, there is schematically shown an organization's typical internal network 100 and its various components. Network access devices 101 and 102 are illustrated as personal computers used to send and receive data requests via an Ethernet network 103 to a network server 104. It should be understood that the network access devices 101 and 102 could also be any other types of devices such as workstations, handheld devices, cellular phones or other devices having trusted access to the network server 104.

Data sent out to the Internet travel through the network server 104 to a high-speed router 105, and then traverse various components of a high-speed Internet connection 106 through 110 that are discussed in detail below. Data returning from the Internet to network access device 101 or 102 flow in opposite direction, from the high speed Internet connection 106 through 110 to the high speed router 105, and then through the network server 104 and across the internal Ethernet 103 to the respective network access device 101 and 102.

Components 106 through 110 in FIG. 1 depict the typical elements of an organization's high-speed Internet connection. An organization's router 105 is connected to local communications circuit 106. This local communications circuit 106 is a copper, fiber, wireless or satellite connection or pathway that links router 105 to the ILEC (Incumbent Local Exchange Carrier), CLEC (Competitive Local Exchange Carrier) or other LAP Point of Presence (POP) 107. The ILEC, CLEC or other LAP POP 107 is then linked to Internet Service Provider "A" (ISP "A") through a copper, fiber, wireless or satellite connection or pathway 108 to ISP A's POP 109. ISP A then connects to its own Internet backbone 121 via one or more copper, fiber, wireless or satellite connections or pathways 110.

The preferred embodiments of the present invention are illustrated in FIG. 2, like numerals being used to refer to like and corresponding parts of the two drawings. FIG. 2 illustrates all of the elements contained in FIG. 1 and adds the teachings of the present invention.

One purpose of the present invention is to provide managed backup Internet access connectivity in the event that an organization's primary Internet access fails. This managed backup Internet access is intended solely to provide backup access only, and to provide such access with the local component of connectivity that is of a different type than the primary means of connecting to the Internet.

Referring to FIG. 1, there are several single points of failure that could cause total loss of Internet connectivity to network 100 and its users. Should router 105 fail, Internet connectivity would be unavailable. Should local communications circuit 106 fail for whatever reason, Internet connectivity would be unavailable. Should any one of a number of problems occur in the ILEC, CLEC or other LAP POP 107 that prevented POP 107 from routing the Internet traffic of network 100, Internet connectivity would be unavailable. Should the connection or pathway 108 between the ILEC, CLEC or other LAP POP 107 and ISP A's POP 109 fail, Internet connectivity would be unavailable. Should the one or more connections or pathways 110 between ISP A's POP 109 and ISP A's Internet backbone 121 fail, Internet connectivity would be unavailable. And, should ISP A's Internet backbone 121 fail, Internet connectivity would be unavailable.

The present invention takes into account each of these several points of failure, and-in the event of any one or a combination of these failures, enables Internet connectivity to be automatically switched over to the managed backup Internet access connectivity provided by the present invention.

Referring to FIG. 2, router 210 is a backup router to primary router 105. Using a standard gateway routing protocol such as Border Gateway Protocol (BGP), backup router 210 is able to communicate with primary router 105. There are several types of standard gateway routing protocols that may be used such as IGRP, HSRP, and EIGRP. In the event of any of the failures noted above that disables the primary Internet connectivity, data traffic is automatically routed from primary router 105 to backup router 210 to provide backup Internet connectivity.

Backup local communications circuit 212 differs from primary local communications circuit 106 in that it is a different type. For example, if primary local communications circuit 106 is a copper pathway, backup local communications circuit 212 is a non-copper pathway such as a fiber, wireless or satellite pathway. If primary local communications circuit 106 is a fiber pathway, backup local communications circuit 212 is a non-fiber pathway such as a copper, wireless or satellite pathway. If primary local communications circuit 106 is a wireless pathway, backup local communications circuit 212 is a non-wireless pathway. If primary local communications circuit 106 is a satellite pathway, backup local communications circuit 212 is a non-satellite pathway. The key is that whatever kind of pathway is used for primary local communications circuit 106, a different type of pathway is used for backup local communications circuit 212.

Backup local communications circuit 212 is connected to backup router 210. In the event of any of the failures noted above that disables the primary Internet connectivity, data traffic is automatically routed from primary router 105 to backup router 210 and then sent across the backup local communications circuit 212. Through the use of gateway routing protocols such as BGP, the network beginning at local communications circuit 212 is able to carry traffic that had the destination of the network beginning at primary local communications circuit 106.

Therefore, the change in the path of access is transparent to the users in the network 100 as well as Internet users accessing a destination on the network 100.

Backup ILEC, CLEC or other LAP POP 214 differs from primary CLEC, ILEC or other LAP POP 107 in that it is a different POP housed in a separate physical location. In the event of any of the failures noted above that disables the primary Internet connectivity, data traffic is automatically routed from primary router 105 to backup router 210 and then sent across the backup local communications circuit 212 to the backup ILEC, CLEC or other LAP POP 214.

The redundant POP 218 is a backup POP that is co-located with an existing ILEC, CLEC or other LAP. In some metropolitan areas, the backup redundant POP 218 and the ILEC, CLEC or other LAP POP 214 will be one and the same. Under the present invention, this occurs when the type of backup local communications circuit 212 needed to provide backup Internet connectivity is available from the same ILEC, CLEC or other LAP in which the backup redundant POP is co-located. In this situation, ILEC, CLEC, or other LAP POP 214 is not required under the present invention. Neither is the high-speed circuit 216 discussed below. In this situation, the backup Internet traffic travels from backup router 210 across backup local communications circuit 212 to the backup redundant POP 218.

In situations in which the type of backup local communications circuit 212 needed to provide backup Internet connectivity is not available from the same CLEC, ILEC or other LAP in which the redundant POP 218 is co-located, then CLEC, ILEC or other LAP POP 214 is required under the present invention. A high-speed circuit 216 that connects ILEC, CLEC or other LAP POP 214 to the redundant POP 218 is also required under the present invention. In this situation, in the event of any of the failures noted above that disables the primary Internet connectivity, data traffic is automatically routed from primary router 105 to backup router. 210, sent across backup local communications circuit 212 to backup ILEC, CLEC or other LAP POP 214 and then across high speed circuit 216 to the backup redundant POP 218.

High speed circuits 220, 222 and 224 provide the redundant connections to carry backup Internet traffic from backup redundantPOP 218 to and from the Internet via three separate Internet backbones 228, 230, and 232. The operators of these backbones may vary from metropolitan area to metropolitan area and could include any combination of three of the five backbones 226, 228, 230, 232, and 121 illustrated in FIG. 2. Other backbones not shown could also be used under the present invention. In the event of any of the failures noted above that disables the primary Internet connectivity, data traffic is automatically routed from primary router 105 to backup router 210, sent across backup local communications circuit 212 to backup ILEC, CLEC or other LAP POP 214 when this backup POP 214 is needed, then across high speed circuit 216 to the backup redundant POP 218, and then across any one, two or all three of the three high speed circuits 220, 222 and 224 to the respective backbone or backbones 228, 230, and/or 232.

A final feature of the present invention is the implementation of usage metering and billing functions in the backup redundant POP 218. Through the use of a processor and software installed in backup redundant POP 218, each customer's monthly usage of the secondary internet backbone is monitored and measured in terms of both time and level of data throughput. This information is then used to calculate monthly overage charges in cases where the customer's usage of the secondary internet backbone exceeds the level of service commitment guaranteed in its basic monthly service package.

The above description has detailed how the present invention enables backup Internet traffic to be carried from network 100 to the Internet, and to enable backup Internet connectivity to carry this traffic in the event of any of the failures noted above that would disable the primary Internet connectivity. The present invention also enables backup Internet traffic to flow from the Internet to network 100 in the exact reverse order as described above using all of the components of the present invention as described, in the event of any of the failures noted above that would disable the primary Internet connectivity.

In summary, a method and apparatus to carry backup Internet traffic is described that automatically becomes operational when primary Internet connectivity fails and becomes unavailable. Although the invention has been described in terms of specific embodiments and applications, persons skilled in the art can, in light of this teaching, generate additional embodiments without exceeding the scope or departing from the spirit of the claimed invention. Accordingly, it is to be understood that the drawings and description in this disclosure are proffered to facilitate comprehension of the invention, and should not be construed to limit the scope thereof. It should be understood that various changes, substitutions and alterations can be made without departing from the spirit and scope of the invention as defined solely by the appended claims.

What is claimed is:

1. A system for providing backup Internet access, the system comprising:

a local network server;

a primary router connected to the local network server, the primary router for directing data to/from a primary internet backbone;

a primary local communications circuit connected to the primary router, the primary local communications circuit employing a primary transmission medium;

a primary point of presence connected to the primary local communications circuit, the primary point of presence for providing internet access via the primary internet backbone;

a secondary router connected to the local network server, the secondary router for directing data to/from a secondary internet backbone;

a secondary local communications circuit connected to the secondary router, the secondary local communications circuit employing a secondary transmission medium of a different type than the primary transmission medium;

a secondary point of presence connected to the secondary local communications circuit, the secondary point of presence for providing internet access via the secondary internet backbone; and control logic operative to detect a failure to provide internet access via the primary router and automatically direct communication to the secondary router; thereby providing backup internet access.

2. The system of claim 1, wherein the primary transmission medium is a copper pathway and the secondary transmission medium is selected from the group consisting of a fiber pathway and a wireless pathway.

3. The system of claim 1, wherein the primary transmission medium is a fiber pathway and the secondary transmission medium is selected from the group consisting of a copper pathway and a wireless pathway.

4. The system of claim 1, wherein the primary transmission medium is a wireless pathway and the secondary transmission medium is selected from the group consisting of a copper pathway and a fiber pathway.

5. The system of claim 1, further including control logic for determining a level of usage of the secondary internet backbone.

6. The system of claim 5, wherein the level of usage is based on time.

7. The system of claim 5, wherein the level of usage is based on throughput of data.

8. The system of claim 1, wherein the secondary internet backbone is dedicated to providing secondary internet access.

* * * * *